(12) United States Patent
Motoyama

(10) Patent No.: US 7,536,313 B2
(45) Date of Patent: May 19, 2009

(54) AUTOMATED MANAGEMENT OF DEVELOPMENT PROJECT FILES OVER A NETWORK

(75) Inventor: Tetsuro Motoyama, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 11/649,450

(22) Filed: Jan. 3, 2007

(65) Prior Publication Data

US 2007/0112776 A1  May 17, 2007

Related U.S. Application Data

(62) Division of application No. 09/881,250, filed on Jun. 13, 2001, now Pat. No. 7,191,141.

(51) Int. Cl.
*G06F 17/50* (2006.01)
(52) U.S. Cl. ...................................................... 705/7
(58) Field of Classification Search .................. 705/9, 705/7
See application file for complete search history.

(56) References Cited

U.S. PATENT DOCUMENTS

| | | | |
|---|---|---|---|
| 4,819,233 A | 4/1989 | Delucia et al. | |
| 4,875,162 A | 10/1989 | Ferriter et al. | |
| 5,197,001 A | 3/1993 | Mukherjee | |
| 5,537,541 A | 7/1996 | Wibecan | |
| 5,603,020 A | 2/1997 | Hashimoto et al. | |
| 5,699,310 A | 12/1997 | Garloff et al. | |
| 5,706,502 A * | 1/1998 | Foley et al. ................... | 707/10 |
| 5,826,086 A | 10/1998 | Arima et al. | |
| 5,826,252 A | 10/1998 | Wolters, Jr. et al. | |
| 5,909,689 A * | 6/1999 | Van Ryzin ................... | 707/203 |
| 6,101,481 A | 8/2000 | Miller | |
| 6,161,113 A | 12/2000 | Mora et al. | |

(Continued)

FOREIGN PATENT DOCUMENTS

WO    WO 98/49640 A1    11/1998

OTHER PUBLICATIONS

Janne "Developing WWW-Based Project Management Tools For a Large Scale Project", Dec. 1997, Tampere University of Technology Department of Information Technology, pp. 1-62.*

(Continued)

*Primary Examiner*—Romain Jeanty
(74) *Attorney, Agent, or Firm*—Hickman Palermo Truong & Becker LLP

(57) ABSTRACT

A technique is provided for managing a project schedule for a development project based on the aggregation of individual task schedules, where the individual task schedules are updated based on inspection results from two or more inspectors specified to inspect a project task product. The schedules, and consequently the updates thereof, are governed by a policy specifying that a task cannot be partially completed. The inspection results are linked to the individual task schedules, which are linked to the associated project schedule. Another technique is provided for managing project files over a network. Acceptance of a project proposal triggers the creation of individual sites for each individual specified to contribute to the project, where individual task schedules and draft project files can be linked to the individual site. The individual sites are linked to a project site and associated file directories are created and also linked to the project site.

12 Claims, 20 Drawing Sheets

U.S. PATENT DOCUMENTS

| | | | |
|---|---|---|---|
| 6,236,409 | B1 | 5/2001 | Hartman |
| 6,308,164 | B1 | 10/2001 | Nummelin et al. |
| 6,351,734 | B1 | 2/2002 | Lautzenheiser et al. |
| 6,385,765 | B1 | 5/2002 | Cleaveland et al. |
| 6,405,361 | B1 | 6/2002 | Broy et al. |
| 6,415,387 | B1 | 7/2002 | Aguilar et al. |
| 6,519,763 | B1 * | 2/2003 | Kaufer et al. ............... 717/101 |
| 6,581,040 | B1 | 6/2003 | Wright et al. |
| 6,859,768 | B1 | 2/2005 | Wakelam et al. |
| 6,901,579 | B1 | 5/2005 | Suguta |
| 6,957,189 | B2 | 10/2005 | Poage et al. |
| 7,107,268 | B1 * | 9/2006 | Zawadzki et al. ............... 707/9 |
| 7,321,864 | B1 * | 1/2008 | Gendler ......................... 705/7 |
| 2002/0046394 | A1 | 4/2002 | Do et al. |
| 2003/0200531 | A1 | 10/2003 | Fairweather |
| 2004/0162750 | A1 | 8/2004 | Motoyama |
| 2005/0050513 | A1 | 3/2005 | Motoyama et al. |
| 2006/0053043 | A1 | 3/2006 | Clarke |

OTHER PUBLICATIONS

Leslie (Cost forecasting—beyond the crystal ball), Dec. 1996, Transactions of AACE international, Dialog file 15, Accession No. 01615178, pp. 201-208.*

Steinbrecher " Project management software allows managers to plan, schedule, and control any project", Feb. 1987, Today's Office v21n9, Dialog file 15, Accession 00351477, pp. 8-14.

Giridhar "The computerized project planning system", Dec. 1998, Transactions of AACE International, Dialog file 275, Accession No. 01103603, pp. PS13-PS16.

Edwards "Project Management With the PC", Oct. 1984, PC Magazine, v3, n21, pp. 109-117, Dialog file 275, Accession No. 01103603.

Goldmann, S., "Procura: a project management model of concurrent planning and design", 5th International Workshops on Enabling Technologies: Infrastructure for Collaborative Enterprises, 1996, printed May 13, 2007, 2 pages.

Janne, "Developing WWW-Based Project Management Tools for A Large Scale Project", Tampere University of Technology, Department of Information Technology, Master of Science Thesis, Jan. 1998, 80 pages.

Petrie, Charles et al., "Agent-Based Project Management", Center for Design Research, Stanford University, Sep. 1999, 25 pages.

Claims, Foreign application No. 07109677.0-1238, 3 pages.

European Patent Office, "European Search Report", Foreign application No. 07109677.0-1238, received Oct. 29, 2007, 8 pages.

Angermeier, George, "Cooperative Project Management with RPLAN", XP-002345614, Copyright Projekt Magazin, Oct. 2002 edition, 6 pages.

Maurer, Frank et al., "Merging Project Planning and Web-Enabled Dynamic Workflow Technologies", XP-002345613, IEEE Internet Computing, Jun. 2000, 10 pages.

Buchbinder et al., "Oracle Project Management, Release 11i", XP-002345049, Oracle, User guide, part No. B10895-02, May 2004, 354 pages.

Janne, "Developing WWW-Based Project Management Tools For a Large Scale Project", dated Dec. 1997, Tampa University of Technology Department of Information Technology, 80 pages.

Christenberry, J. Reid, et al., "Project and Employee Time Tracking—For Information Systems and Technology", dated Nov. 14, 1996, Georgia University, 17 pages.

Mitchell, Karen, "Managers get a needed boost with project linking", dated Dec. 15, 1987, PC Week, v4, n50, Copyright The Gale Group, Dialog Accession No. 03021023, 4 pages.

* cited by examiner

PROJECT INITIATION INTERACTIVE FORM

| Revision Number | Date | Description of Changes (Must include reasons for the change, page number and section number) |
|---|---|---|
| 0.1 | 24Aug98 | Original Draft |
| 0.2 | 13Oct98 | Change the Title of the form by adding Research in front of Project |
| 0.3 | 14Oct98 | Change the Title and made the form generic |
| 0.4 | 7Arp99 | Added "Risk" in the 8.1 subtitle |
| 1.0 | 3Aug99 | corrected spelling and title changed. changed reviewer. "A. Division Head" --> "Division Head" |
| 1.1 | 19Aug99 | "Form" --> "Form" |
| 1.2 | 23Aug99 | Added "Project Number" |
| 1.3 | 2Nov00 | SRDG --> Office Solutions and System Development Group (OSDG) and TSS --> SUPPORT |

| Originator: | Review: | Approval: |
|---|---|---|
| Title: Director | Title: Software Engineer | Title: Division Head |

1. Project 1.1 Description of Project 1.2 Project Type

2. Project Duration (and Cost)

2.1 Project Duration 2.2 Project Cost (if necessary)

3. Project Members and Assignments

4. Goals

5. Objectives

6. Planning Intent (If necessary)

7. Technical Goals (If necessary)

8. Technical Issues and Risks (If necessary)

9. Patent Target

10. Criteria for Evaluation (If necessary)

11. Major Deliverables

12. Milestones

END OF FORM          550

FIG. 5C

J06 Project

Project Documents and Records

| Documents Number | Title and Description 602 |
|---|---|
| Q6-DJ06-yy | Project Documents |
| Q6-RJ06-II-zzz | Inspection Results |
| Q6-RJ06-MM-zzz | Meeting Records |
| Q6-DJ06-CC-zzz | Changes proposed. Decisions, etc. |
| Q6-RJ06-EE-zzz | Error Tracking |
| Q6-RJ06-yy | Other Records |

Zipped Project Source Code ~604

Current Task List ~610
   Avery Fong
   Tetsuro Motoyama

MEMBER WEBSITE ~612
   INDIVIDUAL 1
   INDIVIDUAL 2

Current Risks

Project Schedule ~608

| Dates | Milestones |
|---|---|
| 5 Jan 2001 | Design Freeze |
| 15 Jan 2001 | Status Report |
| 17 Feb 2001 | Status Report |
| 23 Mar 2001 | Closing Meeting and Demo |

Requirements ~606

Index of Project Documents

| Document ID | Title | Rev | Date | Status (Withdrawn, Active, Draft) | Approval |
|---|---|---|---|---|---|
| Q6-DJ106-17 | Analysis of Software Development | 1.0 | 2Feb01 | Active | Approved |
| Q6-DJ106-16 | Project Review: Problems/Difficulties and Successes | 1.0 | 31Jan01 | Active | Approved |
| Q6-DJ106-15 | Implementation and Unit Test Plan | 1.0 | 12Dec00 | Active | Approved |
| Q6-DJ106-14 | Status Report on 7 December 2000 | 1.0 | 7Dec00 | Active | Approved |
| Q6-DJ106-13 | Design Review Request | 1.0 | 29Nov00 | Active | Approved |
| Q6-DJ106-12 | Status Report on 6 November 2000 | 1.0 | 6Nov00 | Active | Approved |
| Q6-DJ106-11 | Integration Test Plan for J06 Project | 0.1 | 26Oct00 | Active | Approved |
| Q6-DJ106-10 | J06 Software Specification | 1.10 | 25Jan01 | Active | Approved |
| Q6-DJ106-09 | Requirement Matrix for J06 Project | 1.3 | 31Jan01 | Active | Approved |
| Q6-DJ106-08 | J06 Project Plan | 1.4 | 14Dec00 | Active | Approved |
| Q6-DJ106-07 | Requirements for J06 Project | 1.2 | 4Dec00 | Active | Approved |
| Q6-DJ106-06 | Organization and Use of the Project Directory for J06 | 1.1 | 20Oct00 | Active | Approved |
| Q6-DJ106-05 | Implementation and Unit Test Plan Guideline for J06 | 1.0 | 12Oct00 | Active | Approved |
| Q6-DJ106-04 | Code Conventions and Visual C++ | 1.1 | 15Dec00 | Active | Approved |
| Q6-DJ106-03 | Procedure for Source Code Control for J06 | 1.1 | 19Oct00 | Active | Approved |
| Q6-DJ106-02 | Design Document Guideline for J06 | 1.0 | 10Oct00 | Active | Approved |
| Q6-DJ106-01 | Project Initiation Form | 1.0 | 6Oct00 | Active | Approved |
| | | | | | |

To Archival Documents          700

FIG. 7A

| | | | | | |
|---|---|---|---|---|---|
| Publication | 27sep00 | 10oct00 | 10oct00 | 10oct00 | 10oct00 |
| Coding Convention | 29sep00 | 29sep00 | 11oct00 | 29sep00 | 11oct00 |
| Draft | 29sep00 | 29sep00 | 2oct00 | 29sep00 | 29sep00 |
| Review/Inspection | 29sep00 | 2oct00 | 11oct00 | 4oct00 | 11oct00 |
| Publication | 29sep00 | 11oct00 | 11oct00 | 11oct00 | 11oct00 |
| Implementation Plan and Unit Test Guideline | 29sep00 | 2oct00 | 12oct00 | 3oct00 | 12oct00 |
| Draft | 29sep00 | 2oct00 | 4oct00 | 3oct00 | 4oct00 |
| Review/Inspection | 29sep00 | 5oct00 | 12oct00 | 5oct00 | 12oct00 |
| Publication/Meeting | 29sep00 | 12oct00 | 12oct00 | 12oct00 | 12oct00 |
| Project Plan | 21sep00 | 25sep00 | 7oct00 | 25sep00 | 17oct00 |
| Draft | 21sep00 | 25sep00 | 29sep00 | 25sep00 | 29sep00 |
| Review/Inspection | 21sep00 | 2oct00 | 13oct00 | 2oct00 | 17oct00 |
| Publication | 21sep00 | 13oct00 | 13oct00 | 17oct00 | 17oct00 |

2. Design

1200

| Tasks | Identified Date | Planned Start | Planned End | Actual Start | Actual End |
|---|---|---|---|---|---|
| Project Architecture | 2oct00 | 2oct00 | 31oct00 | 4oct00 | 19oct00 |
| Draft | 2oct00 | 2oct00 | 20oct00 | 4oct00 | 17oct00 |
| Review/Inspection | ~~2oct00~~ 19oct00 | 23oct00 | ~~31oct00~~ 19oct00 | 18oct00 | 19oct00 |
| Publication/Meeting | ~~2oct00~~ 19oct00 | ~~31oct00~~ 19oct00 | ~~31oct00~~ 19oct00 | 19oct00 | 19oct00 |
| Project Plan Revision | ~~2oct00~~ 19oct00 | ~~31oct00~~ 20oct00 | ~~2nov00~~ 24oct00 | 19oct00 | 23oct00 |
| Draft | ~~2oct00~~ 19oct00 | ~~31oct00~~ 20oct00 | ~~1nov00~~ 23oct00 | 19oct00 | 20oct00 |
| Review/Inspection | ~~2oct00~~ 19oct00 | ~~1nov00~~ 23oct00 | ~~2nov00~~ 24oct00 | 23oct00 | 23oct00 |
| Publication | ~~2oct00~~ 19oct00 | ~~2nov00~~ 24oct00 | ~~2nov00~~ 24oct00 | 23oct00 | 23oct00 |
| Package Design | 19oct00 | 20oct00 | 15nov00 | 20oct00 | 1nov00 |
| Sender Service | | 1202 | 1204 | | |
| Draft | 20oct00 | 20oct00 | 23oct00 | 20oct00 | 23oct00 |
| Review | 20oct00 | 24oct00 | 26oct00 | 24oct00 | 26oct00 |
| Receiver Service | | | | | |
| Draft | 20oct00 | 20oct00 | 23oct00 | 20oct00 | 23oct00 |
| Review | 20oct00 | 24oct00 | 26oct00 | 24oct00 | 26oct00 |

FIG. 12

| RICOH<br>RICOH Corporation | Office Solutions and Systems<br>Development Group<br>Division: SUPPORT | Record Ctrl No.: Q6-RJ-II-090 |
|---|---|---|
| | | Form Number: Q6-F010-01<br>Rev Number 1.3 |
| | Inspection Form | Project Number: J06 |

Meeting Date: 26 Oct 2000 Time: 9:06 - 9:09

Project: J06    Release:_____

Document: SENDER SERVICE    Moderator: AF
                                         — 1302
Time Spent for Preparation: AD 1 / 60
Meeting Type: Inspection (I)
Inspection Type: Document (Doc)
Result: Accept (A) — 1304

Defect Type:
DA = Data, DC = Documentation, FN = Functionality, IF = Interface, LO = Logic, I/O = Input/Output, HF = Human Factors, MN = Maintainability, PF =

Defect Severity, J = Major, N = Minor

Defect                                                                                      1300

| Location | Defect Description | Type | Class | Sever |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 13

| Task | Planned Start Date | Planned End Date | Estimated Deviation (Uncertainty) | Actual Completion Dates |
|---|---|---|---|---|
| Design Document Guidelines for J06 | 28Sep00 | 13Oct00 | 0 | 10Oct00 |
| Code Convention for J06 | 29Sep00 | 13Oct00 | 0 | 11Oct00 |
| Implementation and Unit Test plan guideline for J06 | 2Oct00 | 13Oct00 | 0 | 12Oct00 |
| Source Code Control Procedure for J06 | 2Oct00 | 13Oct00 | 0 | 11Oct00 |
| Project Requirements | 2Oct00 | 16Oct00 | 0 | 16Oct00 |
| Requirements Matrix | 17Oct00 | 19Oct00 | 1 | 18Oct00 |
| J06 Project Plan | 27Sep00 | 17Oct00 | 0 | 17Oct00 |
| Integration Test Plan | 21Sep00 | 31Oct00 | 1 | 26Oct00 |
| Design Document - General Architecture | 2Oct00 | 31Oct00 | 1 | 19Oct00 |
| Revise J06Project Plan schedule | ~~31Oct00~~ 20Oct00 | ~~2Nov00~~ 25Oct00 | 1 | 23Oct00 |
| Design Documentation - Package and Class Design | ~~1Nov00~~ 20Oct00 | ~~22Nov00~~ 15Nov00 | 2 | 2Nov00 |
| TM / Sender Service | 20Oct00 | 26Oct00 | 1 | 26Oct00 |
| TM / Receiver Service | 20Oct00 | 26Oct00 | 1 | 26Oct00 |
| TM / ODBC Interface in Monitor_Send | 24Oct00 | 31Oct00 | 1 | 27Oct00 |
| TM / ODBC Interface in Receive_Store | 27Oct00 | 1Nov00 | 1 | 27Oct00 |
| TM / Database in Monitor_Send | 31Oct00 | 7Nov00 | 2 | 30Oct00 |
| TM / Database in Receive_Store | 31Oct00 | 7Nov00 | 2 | 30Oct00 |
| TM / Device Information | 2Nov00 | 10Nov00 | 2 | 31Oct00 |
| TM / Parser | 8Nov00 | 15Nov00 | 2 | 1Nov00 |
| AF / Device Monitor | 23Oct00 | 27Oct00 | 1 | 27Oct00 |
| AF / Data Transfer | 25Oct00 | 1Nov00 | 1 | 30Oct00 |
| AF / Data Retriever | 30Oct00 | 7Nov00 | 2 | 1Nov00 |
| AF / POP3 Processor | 3Nov00 | 10Nov00 | 2 | 2Nov00 |
| AF / Receiver Manager | 8Nov00 | 15Nov00 | 2 | 2Nov00 |
| Revise J06 Project Plan schedule | 22Nov00 | 28Nov00 | 1 | 3Nov00 |
| Design Documentation - Class Specification | ~~27Nov00~~ 3Nov00 | ~~5Jan01~~ 14Dec00 | 4 | 29Nov00 |

FIG. 14

AUTOMATED MANAGEMENT OF DEVELOPMENT PROJECT FILES OVER A NETWORK

CROSS REFERENCE TO RELATED APPLICATIONS

This is a divisional of prior U.S. patent application Ser. No. 09/881,250, filed Jun. 13, 2001 now U.S. Pat. No. 7,191,141 the entire content of which is incorporated by reference in its entirety for all purposes as if fully set forth herein.

FIELD OF THE INVENTION

The present invention relates generally to project management and, more specifically, to automating tasks for management of a development project over a network.

BACKGROUND

Computer software development projects are inherently difficult to manage. This difficulty is partly due to the large number of tasks and associated deliverables that comprise a software package and the vastness of paperwork and project files associated with these tasks and deliverables. Another contributing factor are the complex interdependencies established between individual tasks and deliverables during the development cycle of a software package.

Management of development projects typically includes organizing, maintaining, and controlling access to project documents, schedules, and the like. Furthermore, there are often multiple development projects occurring concurrently within an enterprise organization, thus significantly expanding the document management efforts. Historically, management of a master project schedule entails, among other tasks, manually entering data into a scheduling application, manually creating links between schedules, and manually aggregating individual developers' task schedules into the master project schedule. These are cumbersome and error-prone tasks, with little to no oversight and quality control.

A master project schedule is often in a state of flux, whereby management solicits the developers for task statuses and related schedule updates. Often, the feedback provided to management by the developers has little oversight and is not according to a rigid policy, procedure, or verification process. Thus, the actual status of a project schedule is often difficult to ascertain since the progress of individual tasks are dictated by subjective, and often self-supporting, progress reports by those individuals that are assigned to the task.

For example, some scheduling systems allow a developer to signify that a task is partially completed, i.e., ninety percent completed. This information is then entered into the scheduling system to determine whether the project is on-schedule. However, because there is generally no accountability as to whether an individual's status is reliable, the current process of obtaining project status tends to shadow the realistic progress of the project.

In view of the foregoing, there is a clear need for a technique for automating management of a development project that reduces manual tasks related to document management and schedule tracking, and which includes criteria for schedule tracking that ensures quality thereof.

SUMMARY OF EMBODIMENTS OF THE INVENTION

A technique is provided for managing a project schedule for a development project based on automatic aggregation of individual task schedules, where the individual task schedules are automatically updated based on inspection results from two or more inspectors specified to inspect a project task product. The schedules, and consequently the updates thereof, are governed by a policy specifying that a task cannot be partially completed. The inspection results are linked to the individual task schedules, which are linked to the associated project schedule, whereby they are made available to authorized persons over a network.

Another technique is provided for managing project files over a network. Using this technique, a project is proposed through an on-line project initiation form. Acceptance of the project proposal triggers the creation of individual sites for each individual specified to contribute to the project, where individual task schedules and draft project files can be linked to the individual site. Furthermore, the individual sites are linked to a project site and associated file directories are automatically created and also linked to the project site. Upon passing inspection by two or more specified inspectors, a draft file is changed to an official file and the official file is denoted accordingly.

These automated techniques provide advantages over prior manual processes, including but not limited to, ensuring the quality and integrity of and controlling access to project files and schedules, and minimizing work-load and potential errors related to management and manipulation of the project files and schedules.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5B illustrates an example of a printed or displayed project initiation form that can be utilized in an embodiment of the invention;

FIG. 5C is a continuation of the exemplary printed/displayed project initiation form of FIG. 5B;

FIG. 6 illustrates an example of a project site, according to an embodiment of the invention;

FIG. 7A illustrates an example of a project document index, according to an embodiment of the invention;

FIG. 12 illustrates an example of an individual task schedule, according to an embodiment of the invention;

FIG. 13 illustrates an printed or displayed example of an on-line inspection form which is utilized to automatically update an individual task schedule, according to an embodiment of the invention;

FIG. 14 illustrates an example of a management schedule, according to an embodiment of the invention.

DETAILED DESCRIPTION OF EMBODIMENTS OF THE INVENTION

Techniques for automating tasks involved in the management of a development project are described. The techniques are described herein primarily in reference to a software development project, but those skilled in the art should recognize that the benefits of the invention are also available when applying the techniques to other development projects. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment

Figure 1:
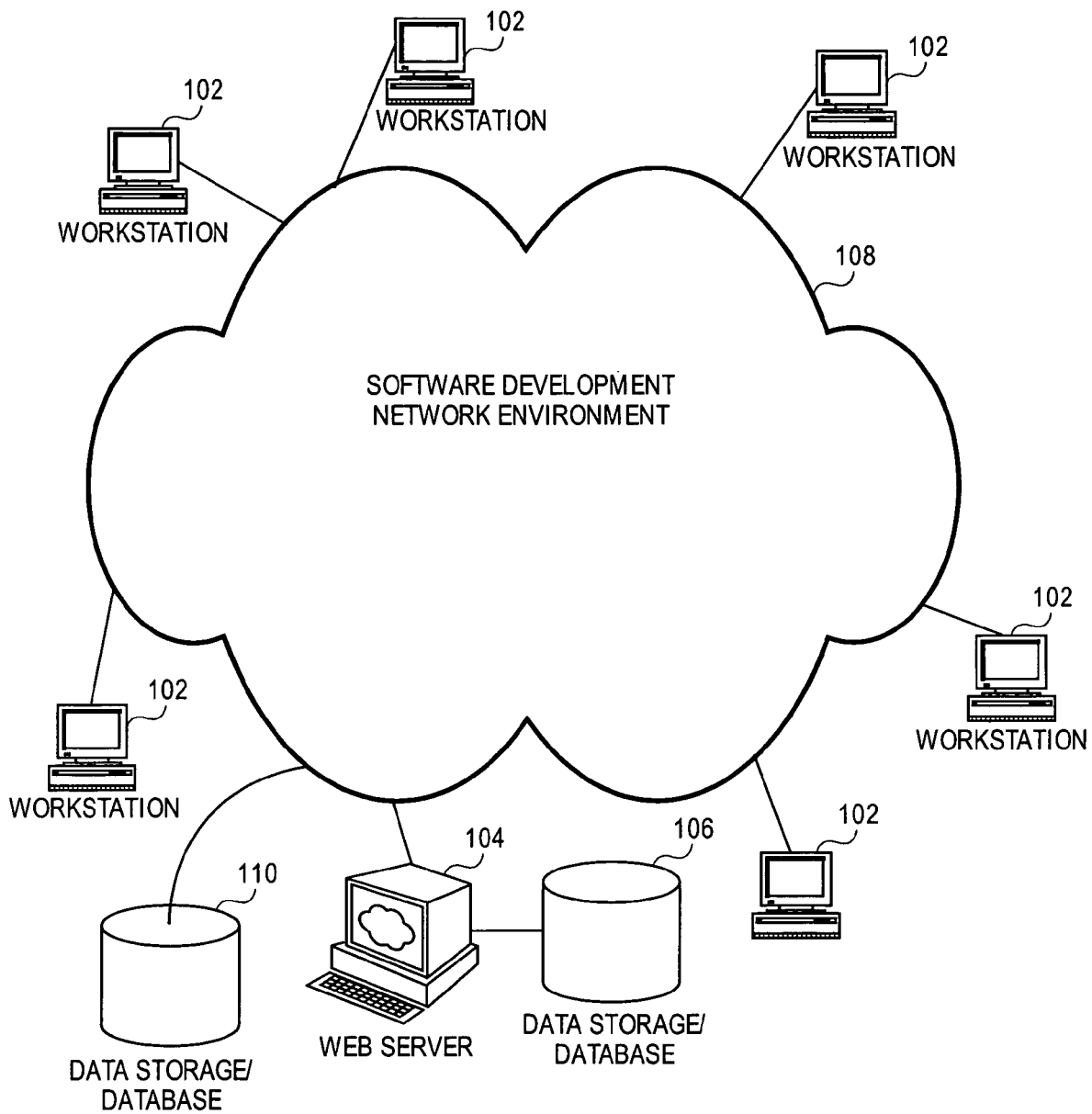
FIG. 1 illustrates an example of an operating environment in which aspects of the invention can be implemented.

FIG. 1 illustrates an example of an operating environment in which aspects of the invention can be implemented. The exemplary operating environment comprises a plurality of workstations 102, a web server 104, and a database 106, all connected directly or indirectly to a software development network 108 for communication therebetween. Optionally, a database 110 may be present for reasons described below.

Figure 2:
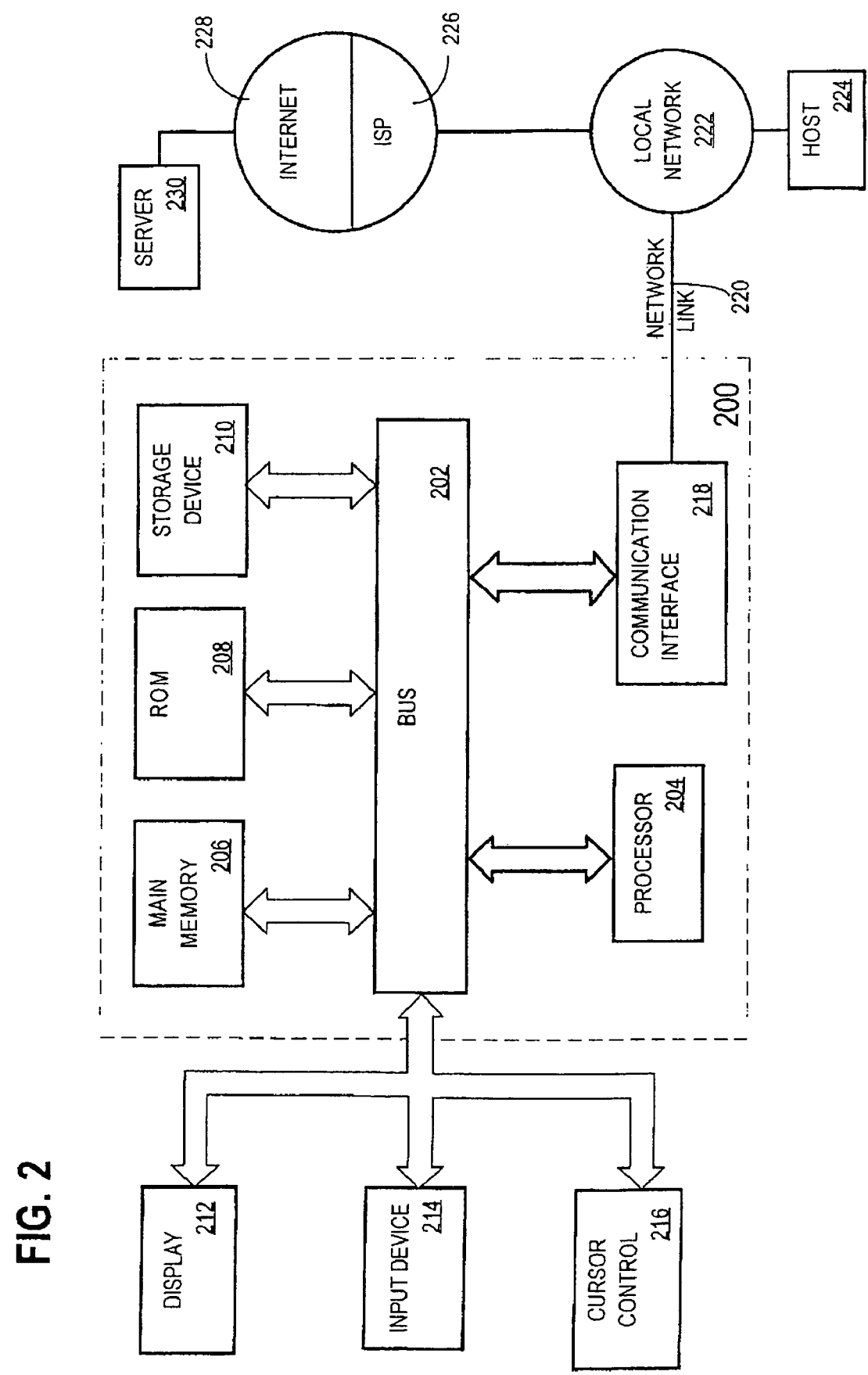
FIG. 2 is a block diagram that illustrates a computer system upon which embodiments of the invention can be implemented.

Workstations 102 are typically computer systems configured as illustrated by the computer system 200 of FIG. 2, and are utilized, for example, by the software engineers/developers to complete tasks associated with a development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 102 for accessing information to review and manage the progress of the project. The developers and managers transmit communications through the network 108 to the other connected components, i.e., web server 104 and database 106.

Web server 104 depicts a conventional web server, which is a program that, using the appropriate protocols (e.g., Hypertext Transfer Protocol [HTTP] and Transmission Control Protocol/Internet Protocol [TCP/IP]), serves the files that form web pages (e.g., Hypertext Markup Language [HTML] or Extensible Markup Language [XML] files), to users, such as developers or managers at a workstation 102. In general, the majority of information exchanged and managed during the development project life cycle is served by the web server 104 over the network 108. Furthermore, aspects of the techniques for automating management of development project files, as described herein, may be implemented and executed on the web server 104, although practice of the invention is not limited to such an implementation. The techniques could also be implemented on any other processing system, such as workstation 102 or a similarly configured computer system as illustrated in FIG. 2.

Database 106 depicts a conventional database for storing information related to the development project, thus providing access to the information by authorized individuals at workstations 102 or web server 104, through queries transmitted over the network 108. The type of information stored on database 106 is virtually limitless, examples including project initiation forms, individual and aggregated management task schedules, specifications, software code, inspection reports, web page files, and document directories and indexes. In addition, other information may be stored on the database 106, as illustrated in and described in reference to FIG. 3. In alternative operating environments, a conventional database 110 is connected directly to the network 108 as a database server.

Network 108 depicts a conventional network, e.g., a packet-switched network, for facilitating the exchange of information between and among various connected components, such as workstation 102, web server 104, and database 106. The network 108 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 108 may also be a Wide Area Network (WAN), such as the Internet, for facilitating communication with remote users through a Virtual Private Network (VPN), or the network 108 may represent a combination of a LAN and a WAN. In addition, network 108 can be formed using a variety of different mediums, including but not limited electrical wire or cable, optical, or wireless connections.

Hardware Overview

FIG. 2 is a block diagram that illustrates a computer system 200 upon which embodiments of the invention can be implemented. Computer system 200 additionally illustrates an example of a system configuration of the workstation 102 (FIG. 1) and the web server 104 (FIG. 1). Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, or magneto-optical disk, is provided and coupled to bus 202 for storing information and instructions.

Computer system 200 may be coupled via bus 202 to a display 212, such as a cathode ray tube (CRT) or a liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, and volatile media. Non-volatile media includes, for example, optical, magnetic disks, or magneto-optical disks, such as storage device 210. Volatile media includes dynamic memory such as main memory 206. Transmission media includes coaxial cables, copper wire and fiber optics, including the wires that comprise bus 202.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Project Database

Figure 3:
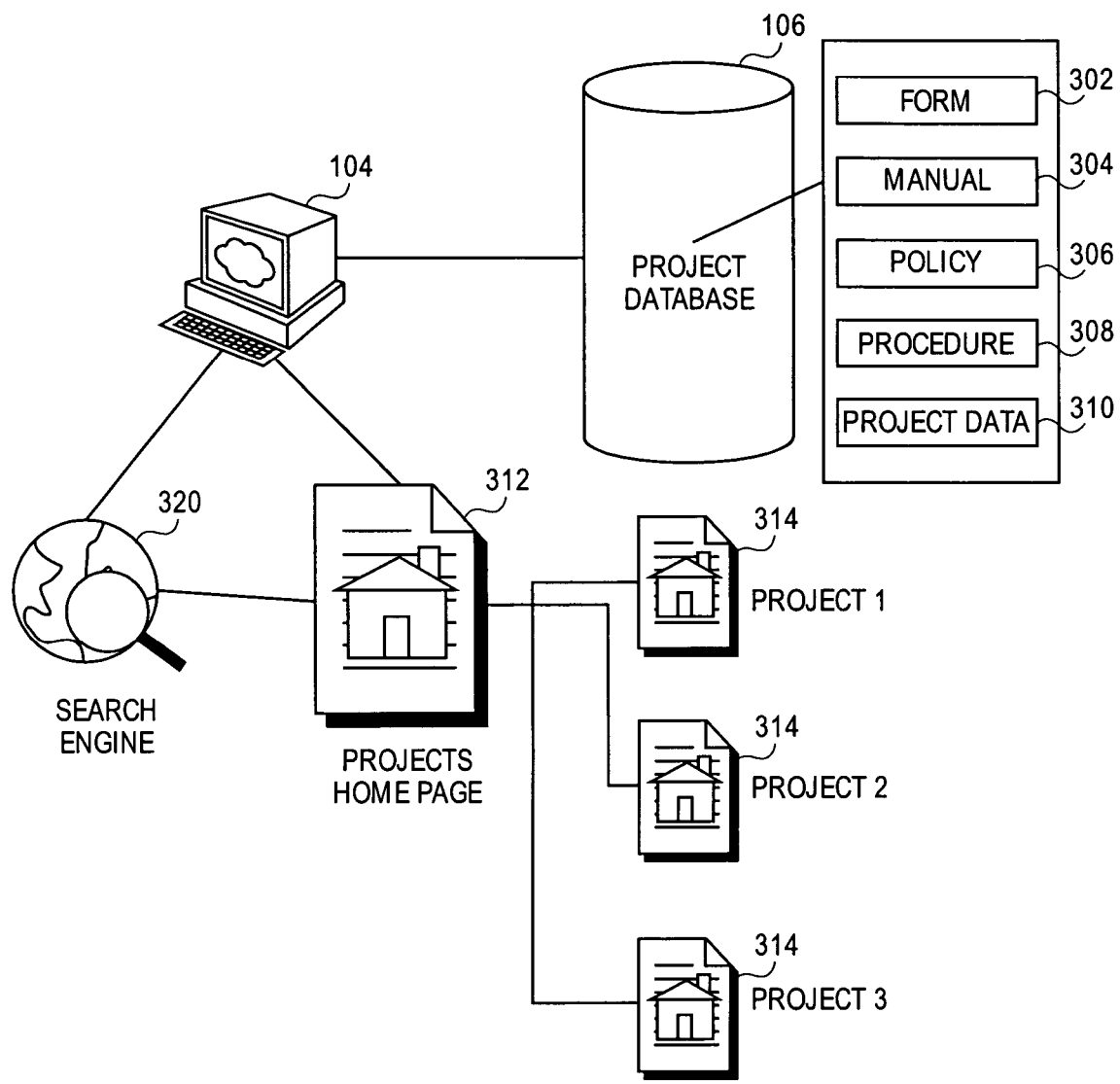
FIG. 3 illustrates examples of data components of a database and web components, according to an embodiment of the invention.

FIG. 3 illustrates example of data components of the database 106 and web components. Database 106 can store files representing various project documents, some being generic project-related documents employed by an enterprise for providing guidance with respect to administering and controlling development projects, and some being specific to a particular project. For examples of generic documents, the database can be configured to store one or more template forms 302 for use by project participants (i.e., engineer/developers, managers, and others), such as a project initiation form (see FIGS. 5B and 5C for a printed example of an interactive project initiation form) or an inspection form (see FIG. 13 for a printed example of an interactive inspection form); and one or more manuals 304, policies 306, and procedures 308, for instructing project participants on enterprise infrastructure, policy and procedures, at least with respect to development projects. The forms 302 facilitate the interactive input of information into the system database 106 and are primarily used by the clients, or individual project participants, and also define the printed outputs.

Project data 310 refers to project-specific documents that may include, but is not limited to, completed project initiation forms (see FIGS. 5B and 5C), individual task schedules (see FIG. 12), aggregated management task schedules (see FIG. 14), specifications, software code, completed inspection forms (see FIG. 13), web page files, and document directories and indexes. Note that the document directories and indexes may alternatively or additionally be stored on the database 110 (FIG. 1). A project participant working on a workstation 102, or alternatively on web server 104, can utilize a search engine 320 to access the database 106 and search for the various generic and project-specific documents.

Different levels of project-specific information can be accessed from the database 106, as is depicted by a projects home page 312 and one or more project sites 314. The projects home page 312 provides links to the one or more project sites 314. As is known in the art, a link is a selectable connection from one word, picture, or information object to another. One example of an implementation of a link is a hyperlink, utilizing a suitable protocol and language such as HTTP and HTML, respectively. The links allow a user to access the project sites 314 from the home page 312, by enacting the link. The link is enacted typically through use of the cursor control 216 (FIG. 2) and/or the input device 214 (FIG. 2), by interacting with an appropriate application such as a conventional web browser. Examples of the information that is linked to, and thus accessible from, the project sites 314 are described below.

Initiating Automated Project File Management

Figure 4A:
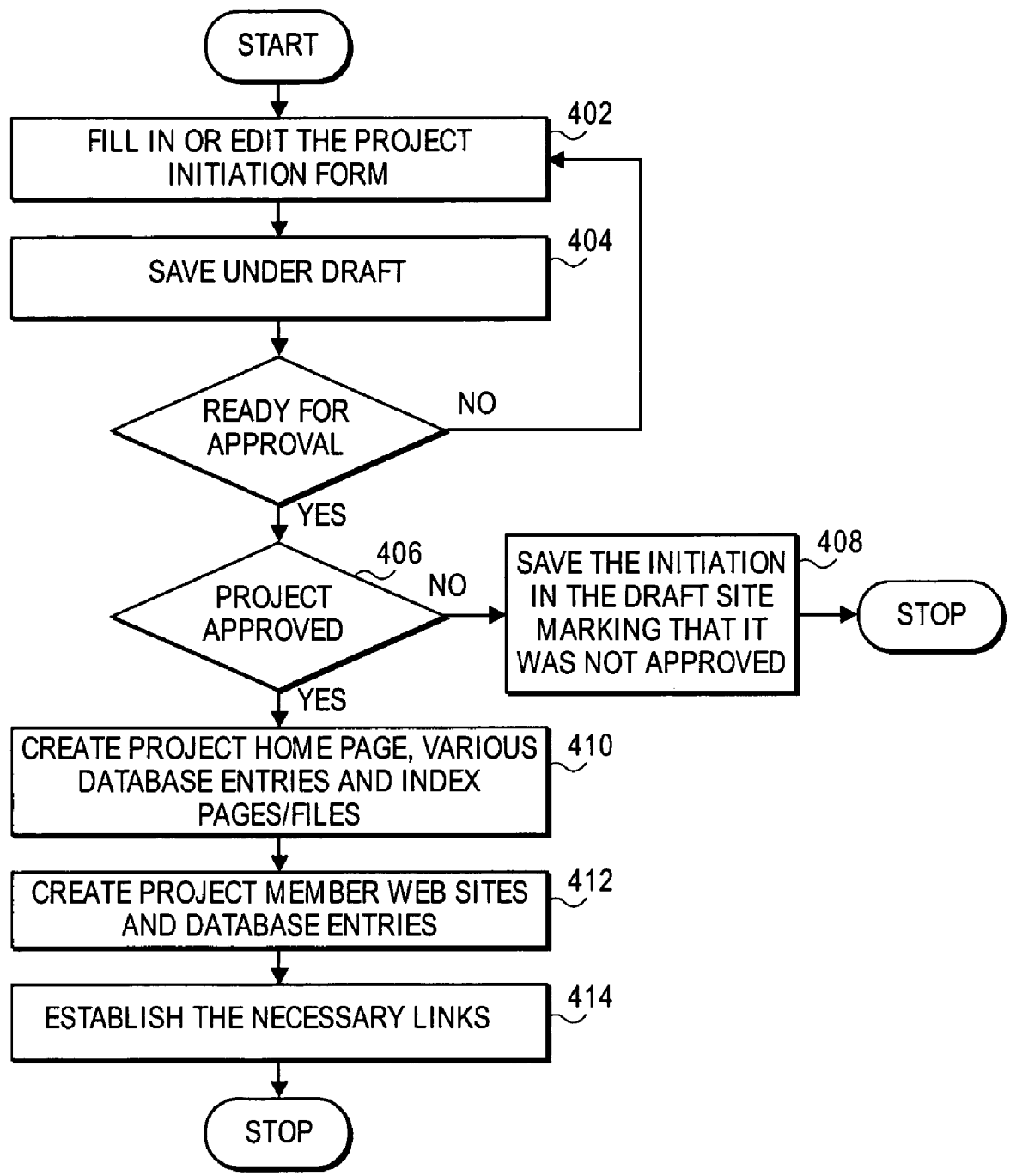
FIG. 4A is a flow chart illustrating steps for initiating automated management of project files over a network, according to an embodiment of the invention.
Figure 5A:
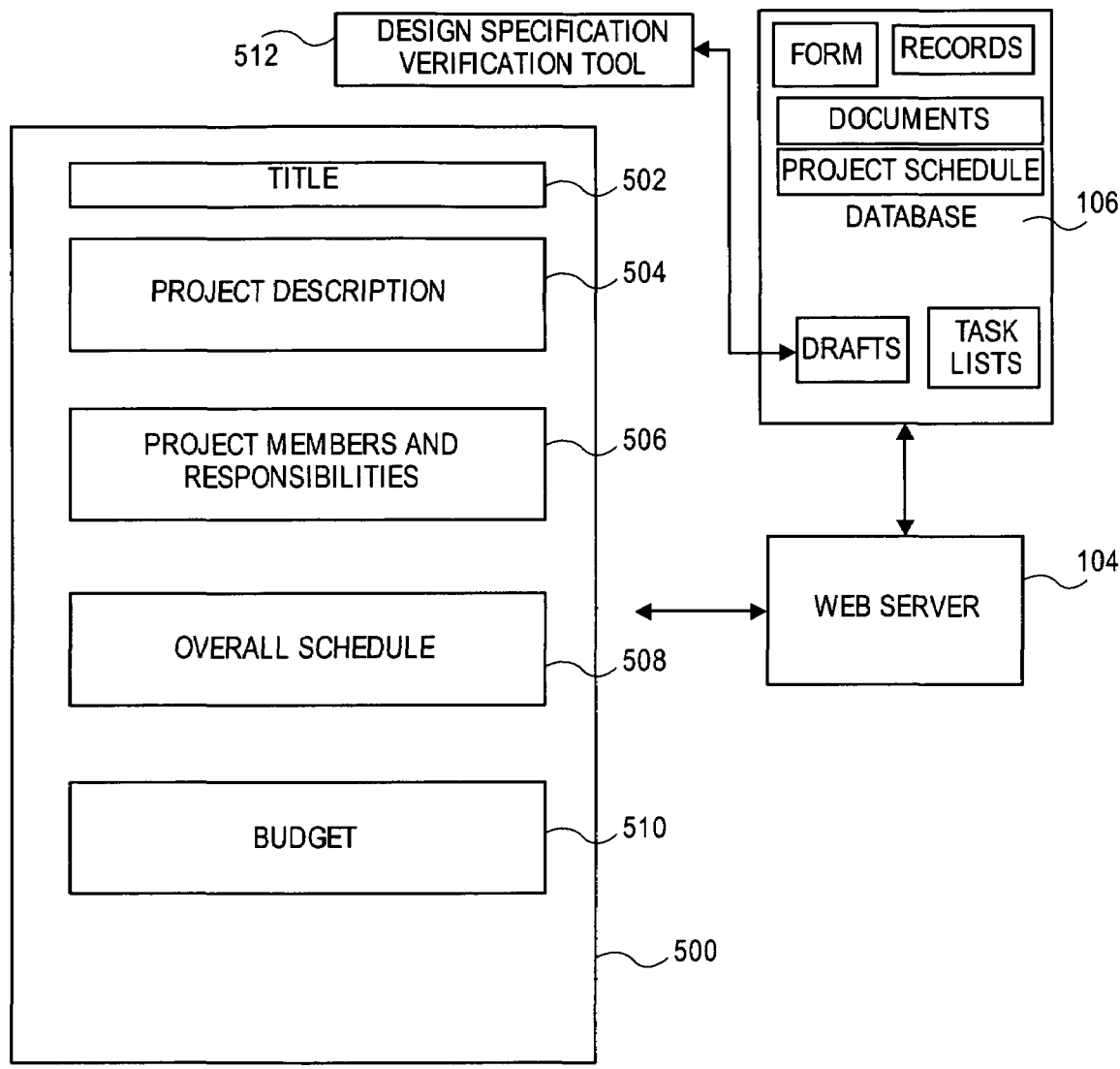
FIG. 5A is a block diagram of an arrangement for initiating a project via an on-line interactive form, according to an embodiment of the invention.

FIG. 4A is a flow chart illustrating steps for initiating automated management of project files over a network, according to an embodiment of the invention. First, at step 402, an individual completes a project initiation form for submission to management for project approval. FIG. 5A is a block diagram of an arrangement for initiating a project via an on-line interactive form 500. The interactive form can be an HTML or XML based page. The project initiator enters the necessary information, for example, the project title 502, project description 504, anticipated project members and responsibilities 506, overall schedule 508, and budget 510, through a network interface, such as a web browser. The entered information is transmitted through the web server 104 to the database 106, where it is initially stored in draft form prior to approval of the requested project, at step 404 of FIG. 4A. Furthermore, the initiator can revise the draft form until proceeding to the project authorization/approval process. The blocks of information depicted in database 106 in FIG. 5A comprise the various information that can be extracted and presented in a project home page or site, such as site 600 of FIG. 6.

An example of a printed or displayed project initiation form 550, illustrating pertinent information headings with the information excluded, is illustrated in FIGS. 5B and 5C. The interactive project initiation form 500 (as exemplified also as form 550) is available from the form 302 (FIG. 3) component of database 106 (FIG. 1), and is linked to other data in the database 106 for automated entry of some data fields. The format of the printed/displayed project initiation form 550 is associated with the form 302.

Referring back to FIG. 4A, at decision block 406 it is determined whether the appropriate project approval authority has approved the proposed project. If the project is not approved, then at step 408 the project initiation form is marked to indicate that the project is not approved, and is stored as a draft in the database 106. Upon approval of the proposed project, at step 410 the project is automatically assigned a project number and an official project site, such as project site 314 (FIG. 3), is automatically created and linked to the project home page, such as project home page 312 (FIG. 3). In addition, various database 106 entries and index pages are created at step 410. At step 412, web sites for individual project participants are created; and linked to the appropriate official project site, at step 414. In addition, the necessary entries are created in the database 106, and linked to the appropriate skeleton files that are utilized by the project participants. The project participants are able to link any working or draft documents to their individual site, whereby the documents will be available to authorized project members through the appropriate chain of links from the project home page, i.e., projects home page 312. Access permissions are restricted and controlled according to document control policies. In certain embodiments, a directory of project files associated with the project is created, stored in the database 106 and database 110 (FIG. 1), and linked to the project site (as shown in FIG. 6). Sub-directories and indexes can be created, as applicable, and linked to the appropriate directory entry on the project site.

Inspection Process-Client

Figure 4B:
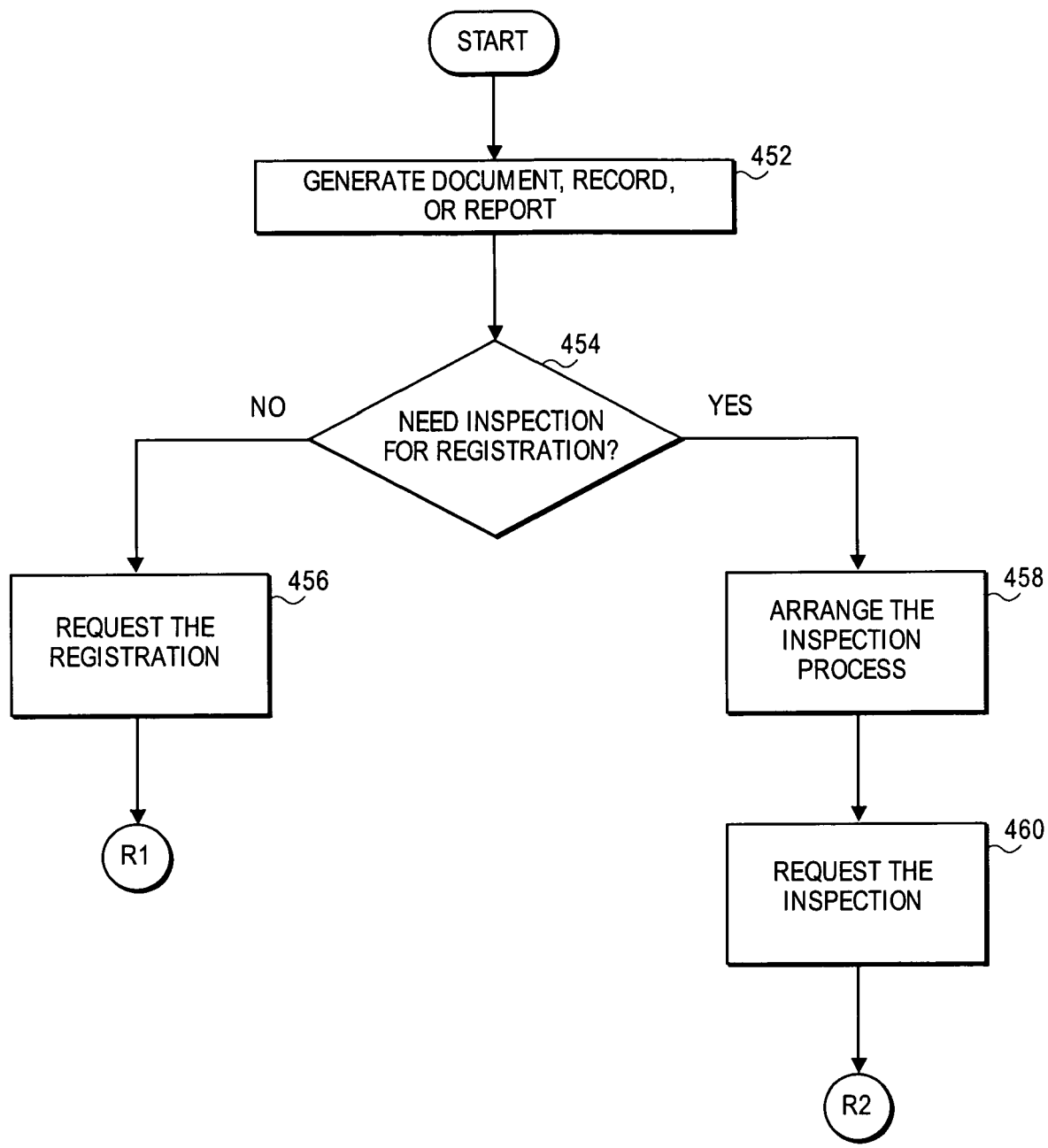
FIG. 4B is a flowchart illustrating steps an individual (client) performs in relation to the document inspection process, according to an embodiment of the invention.
Figure 4C:
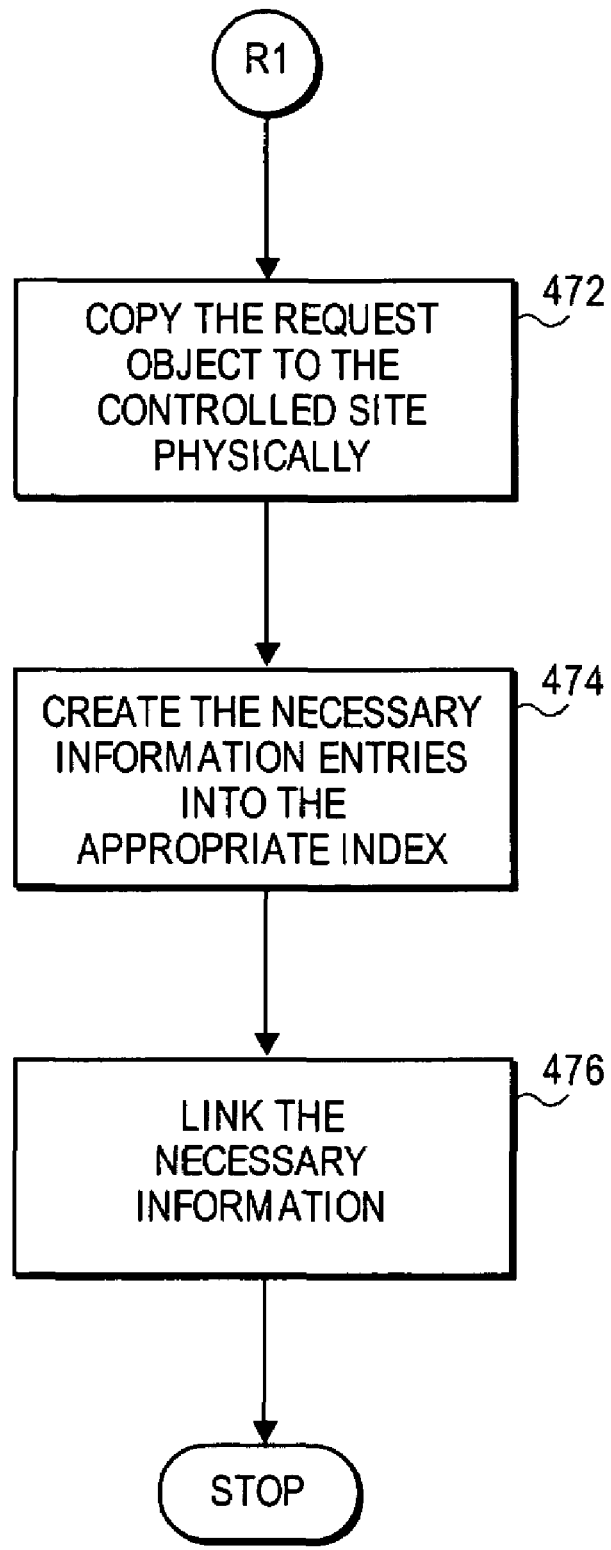
FIG. 4C is a flowchart illustrating a server-side process continuing from R1 of FIG. 4B, according to an embodiment of the invention.

FIG. 4B is a flowchart illustrating steps an individual (client) performs in relation to the document inspection process, according to one embodiment. At step 452, a document, record, or report (reference material) is generated by an individual project participant. At the decision block of step 454, it is determined whether the reference material is the type that requires inspection to ensure quality. For example, some information, such as technical information and records, may not require the quality inspection. In this case, at step 456, the individual requests registration of the document, whereby the flow goes to R1, which is illustrated in FIG. 4C. If inspection of the reference material is deemed necessary to ensure quality, the individual arranges inspection thereof, at step 458. At step 460, an inspection is requested whereby it is registered in the project file management system, to be managed by the processes described herein. In this case, the flow goes to R2, which is illustrated in FIG. 4D.

Inspection Process-Server

FIG. 4C is a flowchart illustrating the server-side process continuing from R1 of FIG. 4B, where the reference material is not inspected and where document registration is requested. At step 472, the reference material is copied into database 106 (FIG. 1) under a controlled environment so that the individual who created the material is no longer able to modify it. At step 474, information entries, for example, the title, date, and originator, are created in the appropriate index page (see 700 of FIG. 7A). At step 476, links are created from the index page to the appropriate documents and corresponding document fields.

Figure 4D:
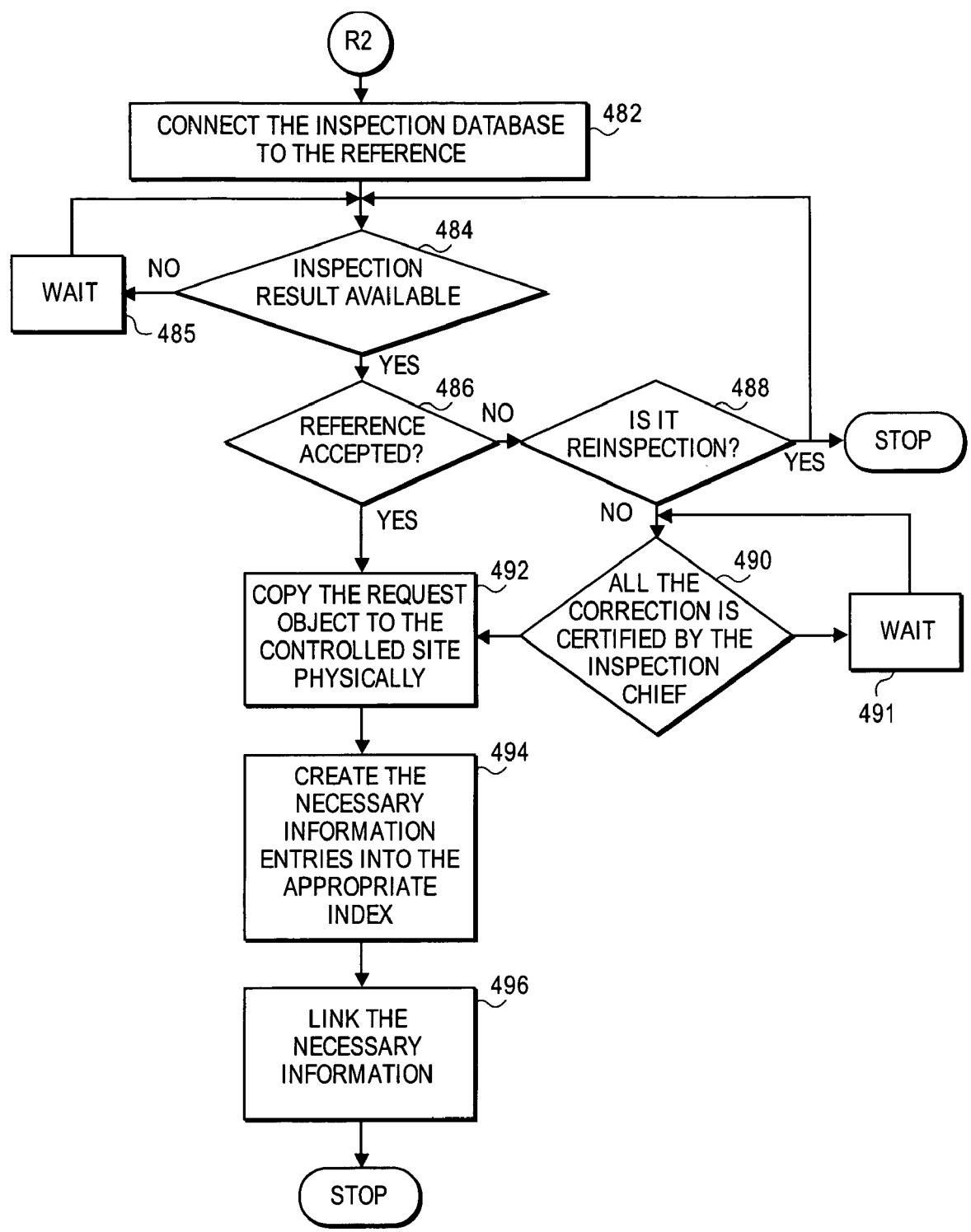
FIG. 4D is a flowchart illustrating the server-side process continuing from R2 of FIG. 4B; according to an embodiment of the invention.

FIG. 4D is a flowchart illustrating the server-side process continuing from R2 of FIG. 4B, where an inspection of the reference material is requested. Generally, the file management system embodying the file management processes described herein, monitors whether the requested inspection completes on schedule and thus, whether inspection results are available. At step 482, an inspection result object (see 774 of FIG. 7B) is linked to the reference material. At decision block 484, it is periodically determined whether inspection results are available. If inspection results are not yet available, the process essentially waits for a certain period to pass, at step 485, and then returns to step 484 to look for inspection results. Once inspection results are available, they are analyzed. At decision block 486, the inspection result is analyzed to determine whether the reference material is denoted as accepted by the associated inspector. If it is determined that the material is not accepted, then at step 488 it is determined whether the material requires re-inspection or if it is conditionally accepted (a disposition different than accepted). If the material requires re-inspection, the database is updated accordingly. At this point, the process could return to step 484 to determine if additional inspection results are available. If the material is conditionally accepted, the flow goes to decision block 490, where the material is checked to determine whether it is modified to meet the specified conditions from the inspection report, and whether the corrections are certified by an inspection chief. If the material is not yet certified by the inspection chief, at step 491, the process waits for a period and returns to step 490.

Once it is determined at decision block 490 that the material has been certified by the inspection chief, the process continues to step 492, which is the same step that is performed if the reference material is accepted at step 486. At step 492, the current inspection material is copied into database 106 (FIG. 1) under a controlled environment so that the individual who created the material is no longer able to modify it. At step 494, information entries, for example, the title, date, and originator, are created in the appropriate index page (see 700 of FIG. 7A). At step 496, links are created from the index page to the appropriate documents and corresponding document fields.

Project Web Pages

FIG. 6 illustrates an example of a project site 600, with links (underlined entities) to several other pages of information specific to a particular project (in this case, the J06 project as shown at top of 600). Links include, but are not limited to, a directory 602 of official project documents and records; a link to project source code 604; a link to the project requirements 606; a link to a project schedule 608; a link to one or more current task lists 610 and member web sites 612 of individuals, i.e., engineers/developers, working on the project.

The directory 602 presents links to indexes of various official documents and records associated with the project, for non-limiting examples, project documents, inspection results, meeting records, changes, error tracking, and other records.

The project schedule link 608 provides access to the aggregated management task schedule, which is exemplified in and described in reference to FIG. 14. The current task list link 610 provides access to the task schedules of each individual assigned tasks for the project, which is exemplified in and described in reference to FIG. 12. Furthermore, the relation between the individual task schedules, accessed via link 610, and the aggregated management task schedule, accessed via link 608, is described in detail below under the headings "Management Schedule Generation" and "Updating a Project Schedule." Finally, the member website link 612 provides access to one or more individual web sites, the creation of which is described above in reference to step 408 of FIG. 4. The individual web sites provide access to draft documents being worked on by the individual, as well as to the individual task lists (see FIG. 12).

Figure 7B:
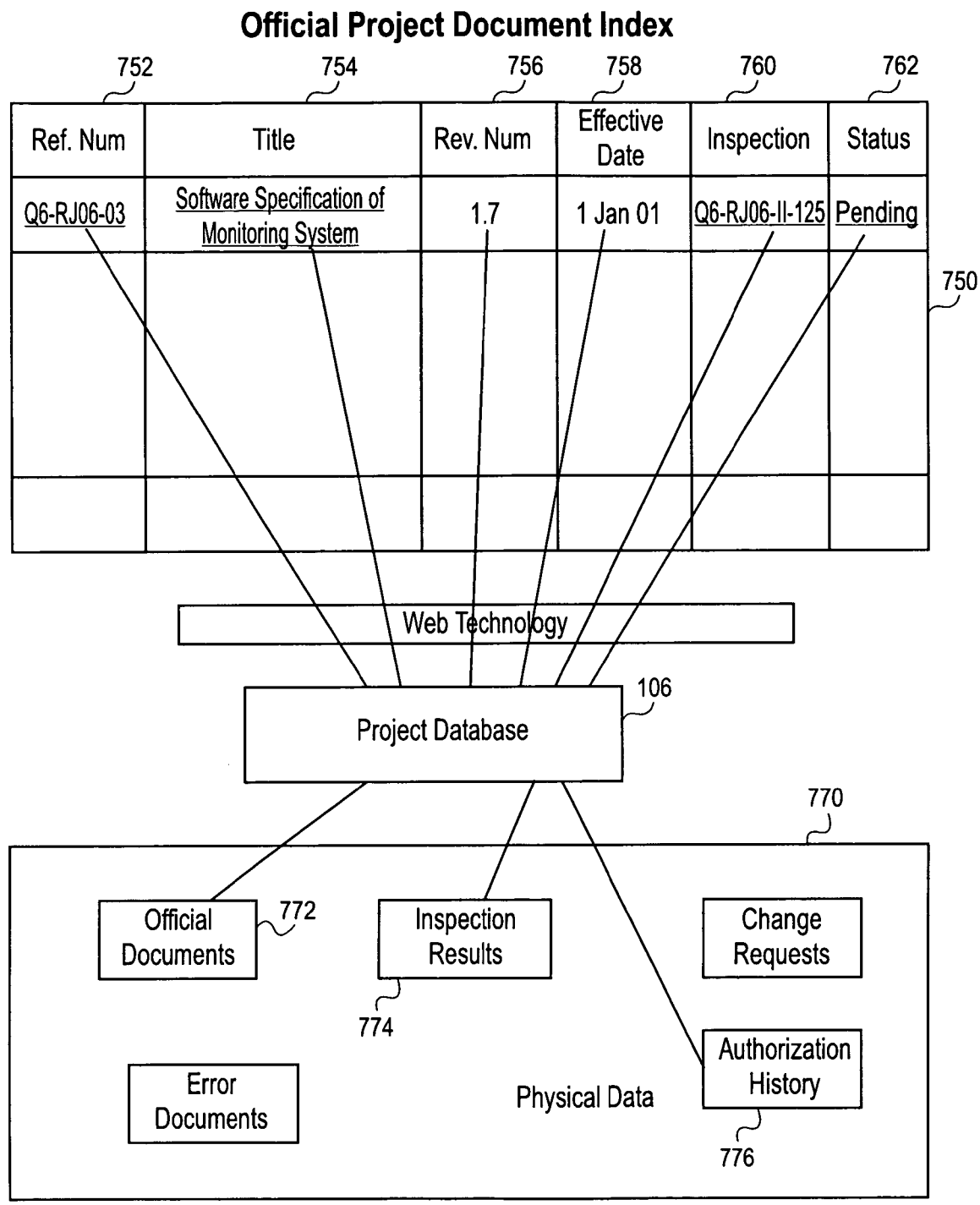
FIG. 7B illustrates link relationships between an example web index page, the project database, and electronic or physical files/objects managed by the database, according to an embodiment of the invention.

FIG. 7A illustrates an example of an index 700, which is an "Index of Project Documents." The index 700, and any other indexes linked to the directory 602, includes links to actual files stored in the database 106 (FIG. 1). FIG. 7B illustrates the link relationships between an example web index page 750, the project database 106, and electronic or physical files/objects 770 managed by the database 106. A reference number 752, a document title 754, and a revision number 756 are linked to the same object, that is, official documents 772. Effective date 758 corresponds to the date that the document is effective or last revised in correspondence with the revision number 756. An inspection 760 field is linked to the inspection results 774 corresponding to the inspections performed on the document. Status 762 presents the current status of the indexed document, that is whether the document is still awaiting authorization from the appropriate party. The status 762 field is linked to the authorization history object 776. The information included in the index 750, under the management of the database 106, is displayable to a client through a web browser interface.

Method for Managing Project Files Over a Network

Figure 8:
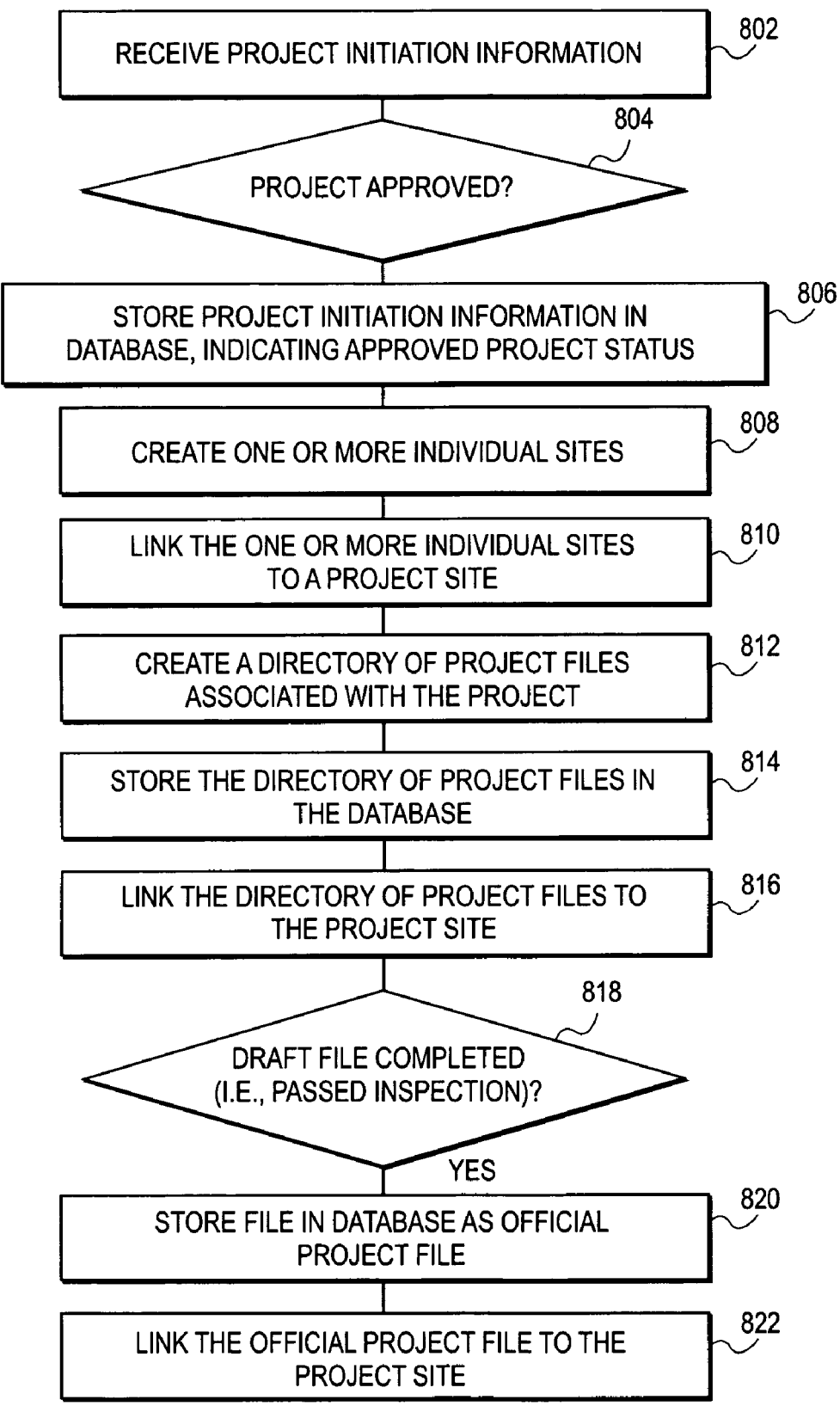
FIG. 8 is a flow chart illustrating steps for managing project files over a network, according to an aspect of the invention.

FIG. 8 is a flow chart illustrating steps for managing project files over a network, according to an aspect of the invention. Project initiation information, preferably including at least a description of the project and of individuals performing a project task, is received at step 802. An example of the information received at step 802 is illustrated in the project initiation form 550 of FIGS. 5B and 5C. At step 804, it is determined whether the project has been approved by the appropriate entity. At step 806, if the project is approved, the project initiation information is stored in a database such as database 106 (FIG. 1 and FIG. 3) in a manner that indicates that the project is approved.

At step 808 of FIG. 8, an individual web site, or page, is created for each of the individuals working on the project. Various informational and work product documents can be linked to the individual web sites; for example, draft files and task schedules. Access to this information is typically regulated and is available to authorized individuals over a network. At step 810, the individual sites are linked to the project site, as exemplified by member web site 612 of project site 600 (FIG. 6). A directory of files associated with the project is created at step 812, which is stored in the database at step 814. The directory of files is linked to the project site at step 816, as exemplified by directory 602 and described in the associated text in reference to FIG. 6.

At step 818 of FIG. 8, it is determined whether a draft file is completed, where completion is defined as passing inspection from at least two inspectors. This criteria which defines a completed file serves at least the following purposes: it ensures the quality and integrity of the file, as a result of the inspection by two or more persons related to the project but not the creators of the file; and it clarifies whether a task is completed by providing a binary completion status, i.e., the task is recorded as completed or not without allowing recordation of a percentage of completion.

Upon completion of a draft file, the status of the file is changed from draft to official and it is stored in the database indicating its status, at step 820. Finally, at step 822, the official file is linked to the project site. As exemplified in reference to FIG. 6 and FIG. 7, the official file may be indirectly linked to the project site through a link to an index, such as index 700, which is in turn linked to a directory, such as directory 602, which is presented on the project site, such as site 600.

Figure 9:
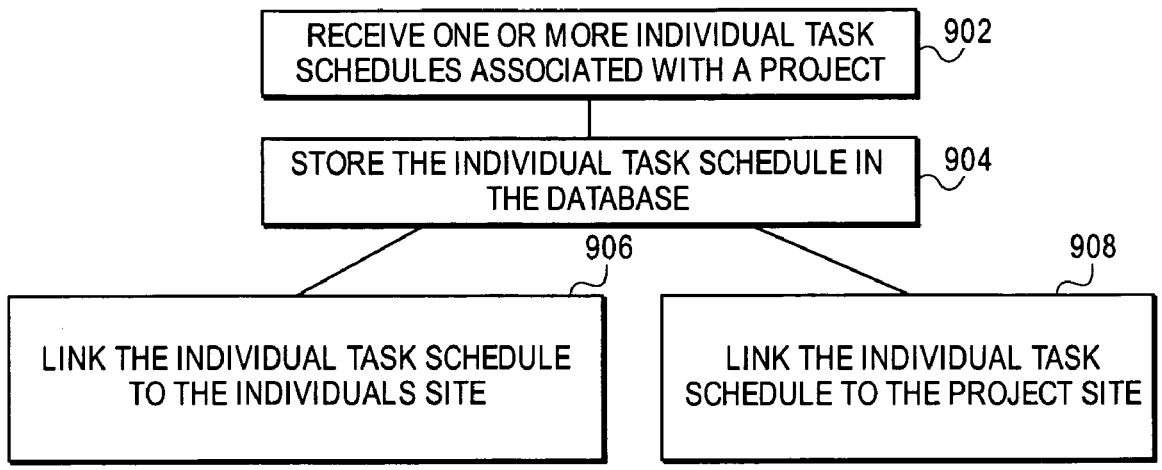
FIG. 9 illustrates an embodiment of the method of FIG. 8, wherein individual task schedules are automatically managed.

FIG. 9 illustrates an embodiment of the method of FIG. 8, wherein individual task schedules are automatically managed. At step 902, one or more task schedules are received from individuals working on the project. At step 904, the individual task schedules are stored in the database 106 (FIG. 1). Steps 906 and 908, which can complete in any order, include at step 906, automatically linking the individual task schedule to the associated individual's site which is accessible via link 610 of FIG. 6, and at step 908, automatically linking the individual task schedule to the project site. The project site link is depicted as current task list 610 and described in the associated text in reference to FIG. 6.

Management Schedule Generation

Figure 10:
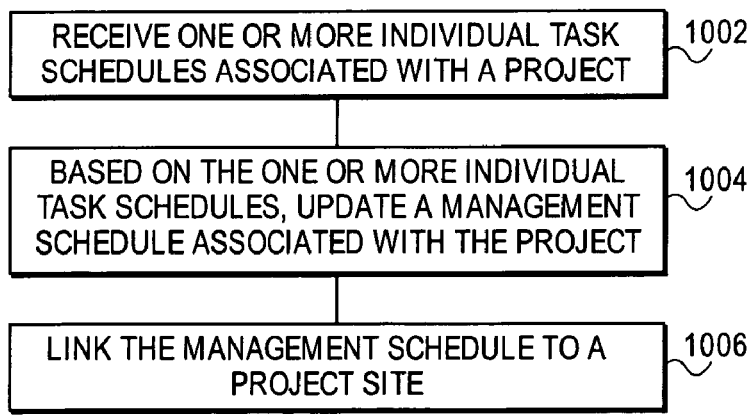
FIG. 10 illustrates another embodiment of the method of FIG. 8, wherein a summary management schedule is automatically managed.

FIG. 10 illustrates another embodiment of the method of FIG. 8, wherein a summary management schedule is automatically managed. At step 1002, one or more task schedules are received from individuals working on the project. At step 1004, a management schedule associated with the same project is updated based on the individual task schedules. An advantage of having the individual task schedules linked to the management task schedule is that the management task schedule can automatically update upon changes to the individual task schedules. At step 1006, the management task schedule is linked to the project site, as depicted as project schedule 608 and described in the associated text in reference to FIG. 6.

Figure 11:
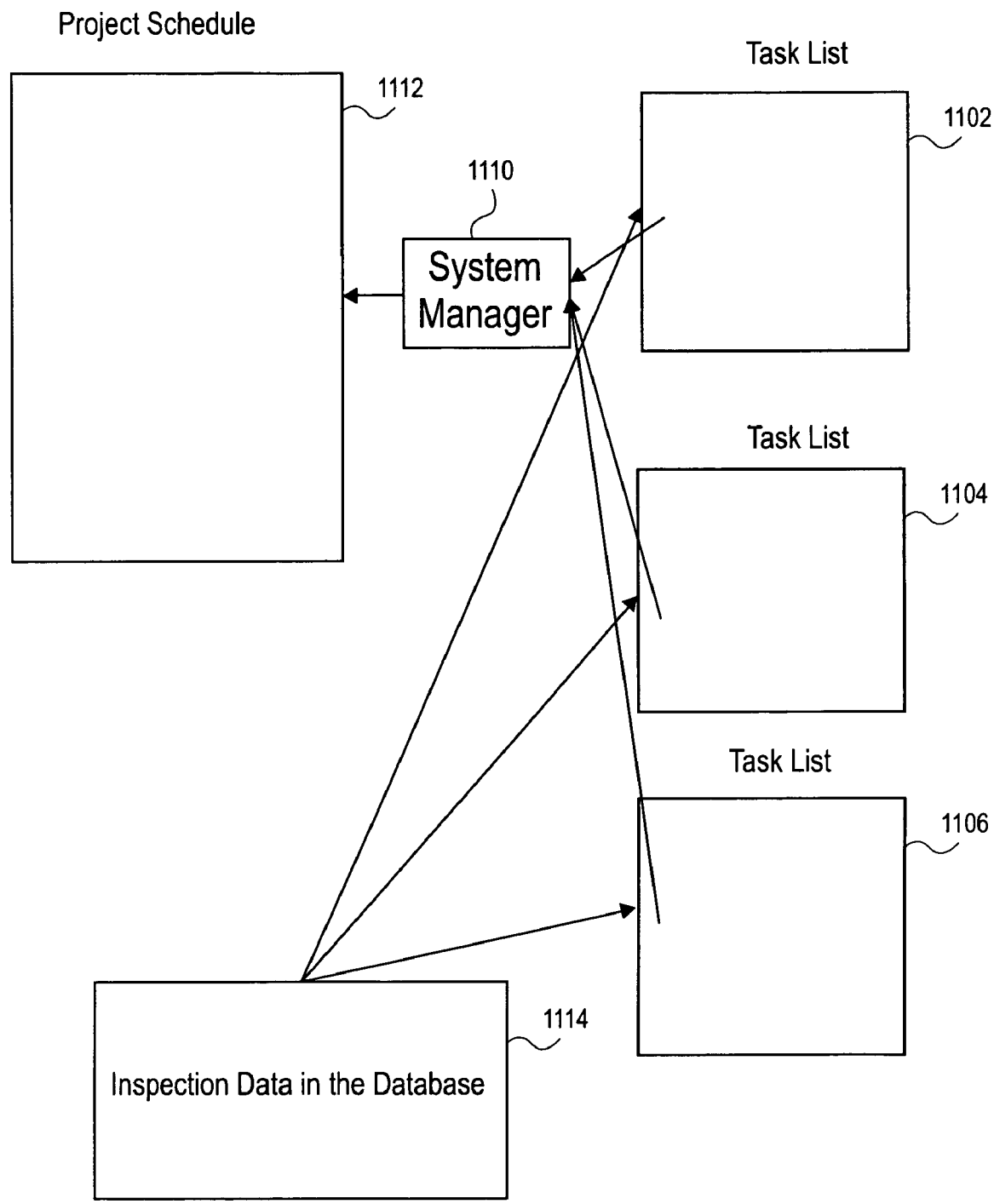
FIG. 11 is a block diagram illustrating associations utilized to manage a project schedule, according to an aspect of the invention.

FIG. 11 is a block diagram illustrating link associations that are used to manage a project schedule by automatically updating the project schedule, according to an aspect of the invention. In this example, multiple task lists 1102, 1104, and 1106 (see FIG. 12 for an example of an individual task list/schedule) are linked to a system manager 1110, which embodies methods for managing the project schedule as described herein. The task lists 1102-1106 are for individuals working on the project, and each task list is typically associated with a separate individual, although practice of the invention is not so limited. The project schedule 1112 (or "management schedule") is an aggregation of the individual task lists 1102-1106, and typically does not include task definitions at the level of detail as the individual task schedules. Hence, the management schedule 1112 summarizes the individual task schedules 1102, 1104, and 1106. For example, FIG. 14 illustrates an example of a management schedule 1400, which is described in further detail below.

The completion of each task in the individual task schedules is linked to inspection forms, completed versions of which are stored in the database 106 (FIG. 1). For example, FIG. 13 illustrates an example of a printed or displayed inspection form 1300, which is described in further detail below. Upon a positive disposition by two or more individuals that have inspection authority with respect to an individual task product, the associated task is considered completed. In one embodiment, the status of each task is binary variable, in that a task cannot be recorded as partially completed. For example, according to the project file management techniques described herein, a task is either completed or not completed, but not a percentage completed. Thus, only after the authorized task inspectors have completed their inspections of the task product and have each stored a completed inspection form in the database 106, does the task product receive an "accepted," or similar, disposition. In certain embodiments, the individual task schedule is automatically updated based on the results of the completed inspection forms. In addition, once the individual task schedules 1102, 1104, and 1106 are updated, the management schedule 1112 is subsequently updated based on the updated individual task schedules 1102, 1104, and 1106.

FIG. 12 illustrates an example of an individual task schedule 1200 for an individual "TM." FIG. 13 illustrates an example of a printed or displayed on-line inspection form 1300. In one embodiment, individual task schedule 1200 and inspection form 1300 provide status data that is used to automatically generate or update a management schedule 1400, as illustrated in FIG. 14. This process is facilitated by the links described in reference to FIG. 11. Upon completion of an inspection form (such as form 1300), an individual task schedule (such as task schedule 1200) is updated according to the completed inspection form, and a management schedule (such as schedule 1400) is consequently updated.

Referring to FIG. 13, document reference 1302 is mapped to the same task in the related individual task schedule. Note that the document reference 1302 does not refer to documents only, but more generally to products of individual tasks. Furthermore, a result reference 1304 is mapped to the "Actual End" column 1208 (FIG. 12) of the related individual task schedule, such as schedule 1200 of FIG. 12. The date that is automatically entered into the "Actual End" column 1208 is automatically determined based on the latest acceptance completion date for all of the required inspection forms (i.e., "Accept" in result reference 1304) for a particular task. The method includes logic for determining when all of the inspections are completed, and whether all of the completed inspection forms have indicated "Accept" in result reference 1304, in order to determine the "Actual End" date for column 1208.

Referring to FIG. 12 and FIG. 14, certain cells of the task schedule 1200 are mapped to the management schedule 1400. For example, cell 1202 of task schedule 1200, which is associated with the earliest "Planned Start" of a particular task, is mapped to cell 1402 of management schedule 1400. Similarly, cell 1204, which is associated with the latest "Planned End" of a particular task, is mapped to cell 1404. Thus, if data in cell 1202 or 1204 is added, revised, or deleted, cell 1402 or 1404 is automatically revised accordingly. Cells 1206 and 1406 are similarly related to each other as are the cells previously discussed. There are numerous other task schedule cells similar to cell 1202 that map to associated management schedule cells for a particular individual, in this case, "TM," thus providing automatic updates of the high-level management schedule 1400 according to an aspect of the invention.

Updating a Project Schedule

Figure 15:
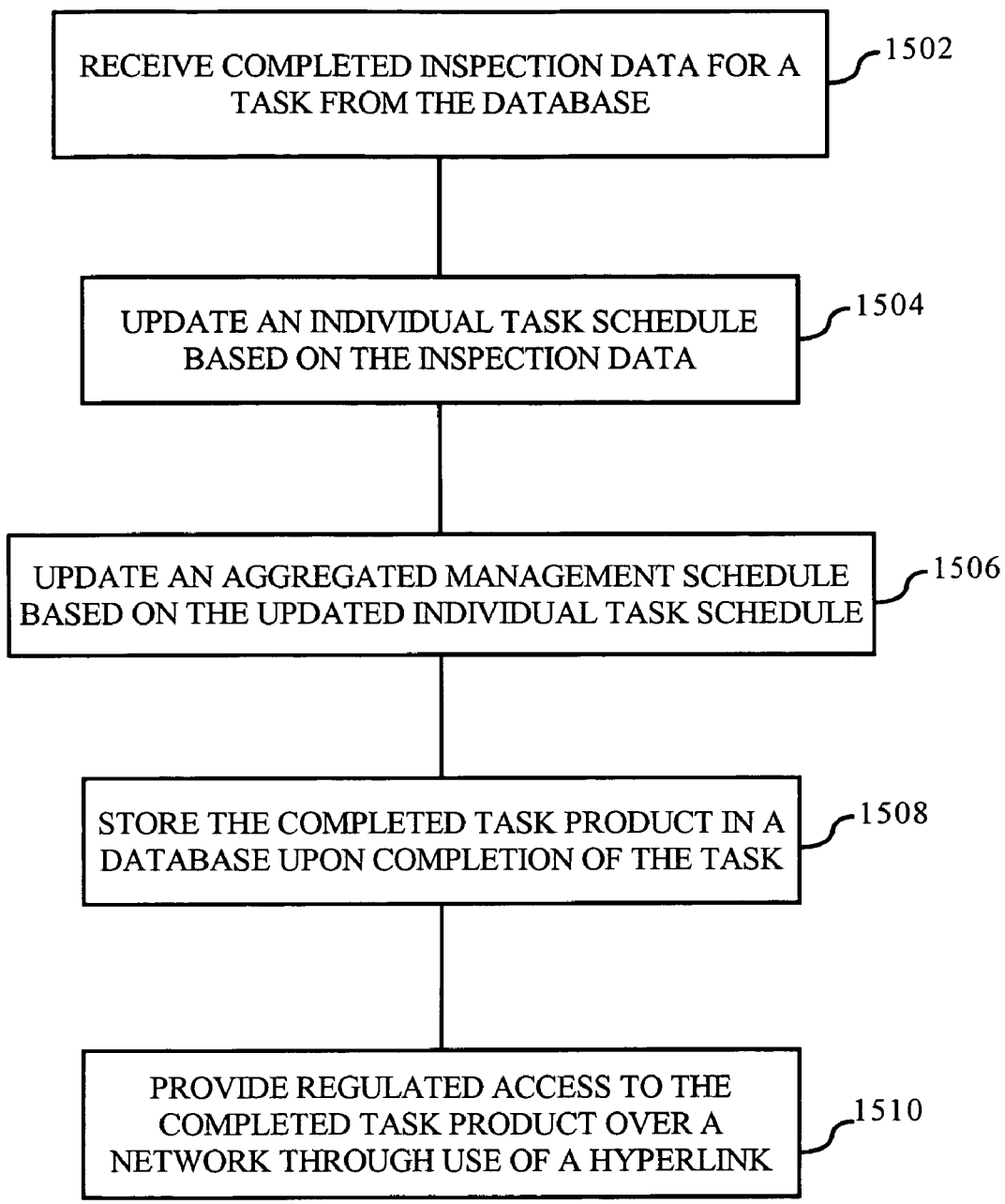
FIG. 15 is a flow chart illustrating steps for generating and updating a schedule for a project, according to an aspect of the invention.

FIG. 15 is a flow chart illustrating steps for generating and/or updating a schedule for a project, according to an aspect of the invention. At step 1502, a completed inspection form including the inspection data is received over a network from the database 106 (FIG. 1). A completed inspection form corresponds to each of two or more inspectors specified to inspect a task product, whereby the completed inspection form includes information based on the inspection. Refer back to FIG. 13 for an example of an inspection form 1300.

At step 1504, an individual's task schedule (i.e., the individual responsible for completing the task), is automatically updated based on the received inspection forms. According to a policy, a project task is not completed unless all inspection result reports so indicate. At step 1506, a management schedule, as exemplified in FIG. 14 and which is an aggregation of all of the individual task schedules associated with the project, is automatically updated based on the updated individual task schedules from step 1504.

In one embodiment, the individual and management schedules are governed by a policy specifying that a project task cannot be partially completed and the automatic updating of the schedules is performed according to this policy.

At step 1508, the completed project task product is stored in the database 106 (FIG. 1 and FIG. 3) and access to the product is regulated according to a document control policy. In one embodiment, the completed task products are accessible via a packet-based network, such as the Internet or an enterprise network, via appropriate links such as hyperlinks.

Hence, the foregoing detailed description describes techniques for automated management of development project files over a network. In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing project files over a network comprising the steps of:
    receiving project initiation information that comprises a description of a project and of one or more individuals performing a project task; and
    upon approval of the project, a computer performing the steps of:
        storing in a database the initiation information to indicate that the project is approved, wherein the initiation information is accessible over the network from a project site;
        automatically creating a directory of project files that are associated with the project;
        storing the directory of project files in the database;
        automatically linking the directory of project files to the project site;
        creating an individual site for each of the one or more individuals performing a project task, wherein individual draft project files stored in the database are linked to each of the associated individual sites; and
        automatically linking the one or more individual sites to the project site.

2. The computer-implemented method of claim 1 wherein completion of a draft project file is defined as passing inspection from at least two authorized inspectors, the method further comprising the steps of:
    upon completion of an individual draft project file, changing the status of the draft project file to an official project file;
    storing the official project file in the database, wherein access to the official project file by one or more authorized individuals is regulated; and
    automatically linking the official project file to the project site.

3. The computer-implemented method of claim 1 further comprising the steps of:
    receiving at least one task schedule for each individual performing a project task;
    storing the task schedule in the database; and
    automatically linking the task schedule to the individual site associated with the individual for which the task schedule was received.

4. The computer-implemented method of claim 1 further comprising the steps of:
    receiving a task schedule for each individual performing a project task;
    storing the task schedule in the database; and
    automatically linking the task schedule to the project site.

5. The computer-implemented method of claim 1 further comprising the steps of:
    compiling project files associated with one or more file types;
    creating one or more indexes of project files wherein each index is associated with one of the file types;
    storing the one or more indexes of project files in the database; and
    automatically linking the one or more indexes of project files to the directory of project files.

6. The computer-implemented method of claim 1 further comprising the steps of:
    receiving a task schedule for each individual performing a project task;
    based on one or more task schedules, automatically updating a management schedule comprising an aggregation of tasks associated with the project; and
    automatically linking the management schedule to the project site.

7. A computer-readable medium carrying one or more sequences of instructions for managing project files over a network, wherein execution of the one or more sequences of instructions by one or more processors causes the one or more processors to perform the steps of:
    receiving project initiation information that comprises a description of a project and of one or more individuals performing a project task; and
    upon approval of the project,
        storing in a database the initiation information to indicate that the project is approved, wherein the initiation information is accessible over the network from a project site;
        automatically creating a directory of project files that are associated with the project;
        storing the directory of project files in the database;
        automatically linking the directory of project files to the project site;
        creating an individual site for each of the one or more individuals performing a project task, wherein individual draft project files stored in the database are linked to each of the associated individual sites; and
        automatically linking the one or more individual sites to the project site.

8. The computer readable medium of claim 7 wherein completion of a draft project file is defined as passing inspection from at least two authorized task inspectors and wherein execution of the one or more sequences of instructions by one or more processors causes the one or more processors to perform the steps of:
    receiving a task schedule for each individual performing a project task;
    storing the task schedule in the database; and
    automatically linking the task schedule to the project site.

9. The computer readable medium of claim 7 wherein execution of the one or more sequences of instructions by one or more processors causes the one or more processors to perform the steps of:
    receiving a task schedule for each individual performing a project task;
    automatically updating a management schedule comprising an aggregation of tasks associated with the project based on one or more task schedules; and
    automatically linking the management schedule to the project site.

10. A computer system comprising:
    a network interface; and
    one or more processors connected to the network interface, the one or more processors configured for
    receiving project initiation information that comprises a description of a project and of one or more individuals performing a project task; and
    upon approval of the project,
        storing in a database the initiation information to indicate that the project is approved, wherein the initiation information is accessible over the network from a project site;
        automatically creating a directory of project files that are associated with the project;
        storing the directory of project files in the database;
        automatically linking the directory of project files to the project site;

creating an individual site for each of the one or more individuals performing a project task, wherein individual draft project files stored in the database are linked to each of the associated individual sites; and automatically linking the one or more individual sites to the project site.

11. The computer system of claim 10 wherein completion of a draft project file is defined as passing inspection from at least two authorized task inspectors and wherein the one or more processors are further configured for:

receiving a task schedule for each individual performing a project task;

storing the task schedule in the database; and automatically linking the task schedule to the project site.

12. The computer system of claim 10 wherein the one or more processors are further configured for:

receiving a task schedule for each individual performing a project task;

based on one or more task schedules, automatically updating a management schedule comprising an aggregation of tasks associated with the project; and automatically linking the management schedule to the project site.

* * * * *